United States Patent
Jin

(10) Patent No.: US 9,242,322 B2
(45) Date of Patent: Jan. 26, 2016

(54) JIG FOR ALIGNING DOOR HINGE OF AUTOMATIC SYSTEM FOR MOUNTING DOOR HINGE TO VEHICLE

(71) Applicants: Hyundai Motor Company, Seoul (KR); Kia Motors Corporation, Seoul (KR)

(72) Inventor: Taeheun Jin, Gyeongsan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 241 days.

(21) Appl. No.: 13/948,012

(22) Filed: Jul. 22, 2013

(65) Prior Publication Data

US 2014/0167342 A1  Jun. 19, 2014

(30) Foreign Application Priority Data

Dec. 17, 2012  (KR) .................. 10-2012-0147784

(51) Int. Cl.
  *B23P 19/10* (2006.01)
  *B23P 21/00* (2006.01)
  *B62D 65/02* (2006.01)

(52) U.S. Cl.
  CPC .............. *B23P 19/10* (2013.01); *B23P 21/00* (2013.01); *B62D 65/026* (2013.01); *B23P 2700/08* (2013.01)

(58) Field of Classification Search
  CPC .......... B25B 5/062; B25B 5/122; B25B 5/16; B25B 5/087; B25B 5/061; B23Q 3/06; B23P 19/002; B23P 19/10
  USPC ............. 269/27, 104; 29/237, 468, 700, 821, 29/281.4
  See application file for complete search history.

(56) References Cited

U.S. PATENT DOCUMENTS

| | | | |
|---|---|---|---|
| 7,818,857 B1 * | 10/2010 | Viviano | 29/237 |
| 8,898,877 B2 * | 12/2014 | Lee et al. | 29/281.4 |
| 2009/0265888 A1 * | 10/2009 | Lee et al. | 16/252 |
| 2013/0091687 A1 * | 4/2013 | Lee et al. | 29/468 |
| 2014/0165386 A1 * | 6/2014 | Jin | 29/700 |
| 2014/0165387 A1 * | 6/2014 | Jin | 29/821 |

FOREIGN PATENT DOCUMENTS

| | | |
|---|---|---|
| JP | 2005-47453 A | 2/2005 |
| KR | 10-0598858 B1 | 7/2006 |
| KR | 10-0737008 B1 | 7/2007 |

* cited by examiner

*Primary Examiner* — Lee D Wilson
*Assistant Examiner* — Jamal Daniel
(74) *Attorney, Agent, or Firm* — Morgan, Lewis & Bockius LLP

(57) ABSTRACT

A jig for aligning door hinges into a position at a predetermined mounting angle in an automatic system that automatically mounts door hinges to upper and lower seats on pillars of a vehicle body conveyed by a conveying unit. The jig may include a support frame, a first support part fixed to the support frame and supporting a hinge bracket of the door hinge, a pair of second support parts movably disposed at both sides of the first support part and respectively supporting both sides of a door bracket of the door hinge, and an actuating cylinder fixed to the support frame and connected with the second support parts.

10 Claims, 6 Drawing Sheets

(a)

(b)

JIG FOR ALIGNING DOOR HINGE OF AUTOMATIC SYSTEM FOR MOUNTING DOOR HINGE TO VEHICLE

CROSS-REFERENCE TO RELATED APPLICATION

The present application claims priority of Korean Patent Application Number 10-2012-0147784 filed Dec. 17, 2012, the entire contents of which application are incorporated herein for all purposes by this reference.

BACKGROUND OF INVENTION

1. Field of Invention

The present invention relates to an automatic system for mounting a door hinge to a vehicle. More particularly, the present invention relates to a jig for aligning a door hinge or hinges at a predetermined mounting angle on a vehicle.

2. Description of Related Art

In general, the process of mounting a door to a vehicle body is implemented by mounting door hinges to the front and rear pillars of a side panel and then fastening a door to the door hinges.

The process of mounting door hinges is implemented by bringing door hinges in close contact with upper and lower seats of the front and rear pillars with a door hinge mounting jig and then bolting the door hinges to the door hinge seats, after a vehicle body is moved into a position for work by a conveyor system.

The door hinge mounting jig can move forward to the side panel of the vehicle body, with the door hinges loaded, insert a tooling pin into the vehicle body, clamp the vehicle body, and move a door into a position on the upper and lower door hinge seats of the front and rear pillars. In this status, a worker manually bolts the door hinges to the door hinge seats with an electric fastening device.

The process of mounting door hinges described above loads the door hinges on the mounting jig and then fastens the door hinges on the mounting jig to the hinge seats of a vehicle body. The process may cause an increase in manufacturing cost, because it depends on the manual work throughout the aligning and mounting of the door hinges to a vehicle body.

Further, since the door hinges are manually fastened in the process of mounting door hinges, it is difficult, if not impossible, to avoid assembly variation, which may deform a door or deteriorate the external appearance of the door. Consequently, it deteriorates productivity, because the work for maintaining the product quality takes long time, including mounting again the door hinges in the following processes.

Therefore, it is required to develop automated equipments that can automatically align door hinges, before loading the door hinges onto a mounting jig, in order to solve such problems or at least some of problems in the art.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a jig for aligning door hinges in an automatic system for mounting door hinges to a vehicle having advantages of being able to automatically arrange door hinges into a position at a predetermined mounting angle to a vehicle body before loading the door hinges onto a jig for mounting door hinges.

Various aspects of the present invention provide a jig for aligning door hinges in an automatic system for mounting door hinges to a vehicle. The jig aligns door hinges into a position at a predetermined mounting angle in an automatic system that automatically mounts door hinges to upper and lower seats on pillars of a vehicle body conveyed by a conveying unit. The jig may include a support frame, a first support part fixed to the support frame and supporting a hinge bracket of the door hinge, a pair of second support parts movably disposed at both sides of the first support part and respectively supporting both sides of a door bracket of the door hinge, and an actuating cylinder fixed to the support frame and connected with the second support parts.

The jig for arranging door hinges in an automatic system for mounting door hinges to a vehicle may further include a clamper fixed to the support frame and clamping the hinge bracket by operation of the clamping cylinder.

In the jig for arranging door hinges in an automatic system for mounting door hinges to a vehicle, a pair of guide members that guides both sides of the hinge bracket may be included in the first support part.

In the jig for arranging door hinges in an automatic system for mounting door hinges to a vehicle, at least one tooling pin aligning the hinge bracket may be formed at the first support part.

In the jig for arranging door hinges in an automatic system for mounting door hinges to a vehicle, an approach sensor that senses whether the hinge bracket is seated may be included in the first support part.

In the jig for arranging door hinges in an automatic system for mounting door hinges to a vehicle, each of the second support parts may include a mounting bracket fixed to an actuating rod of the actuating cylinder, and a pair of guide plates facing each other at a predetermined distance and fixed to the mounting bracket, wherein the pair of guide plates fixes both sides of the door bracket and arranges the door hinge into the position at the predetermined mounting angle.

In the jig for arranging door hinges in an automatic system for mounting door hinges to a vehicle, the upper portions of the pair of guide plates may be smoothly curved away from each other.

Various other aspects of the present invention provide a jig for aligning door hinges in an automatic system for mounting door hinges to a vehicle. The jig aligns door hinges into a position at a predetermined mounting angle in an automatic system that automatically mounts door hinges to upper and lower seats on pillars of a vehicle body conveyed by a conveying unit. The jig may include a support frame, a base member fixed to the support frame and supporting a hinge bracket of the door hinge, a pair of supporting members disposed on the base member to be movable toward or away from each other at both sides of the door hinge, and respectively supporting both sides of a door bracket of the door hinge, and an actuating cylinder fixed to the base member and connected with the supporting members.

The jig for arranging door hinges in an automatic system for mounting door hinges to a vehicle may further include a damper fixed to the support frame and clamping the hinge bracket.

In the jig for arranging door hinges in an automatic system for mounting door hinges to a vehicle, a seating groove where to seat the hinge bracket of the door hinge may be formed on the base member.

In the jig for arranging door hinges in an automatic system for mounting door hinges to a vehicle, fixing grooves that fix both sides of the door bracket may be formed at the supporting members, respectively.

In the jig for arranging door hinges in an automatic system for mounting door hinges to a vehicle, the actuating cylinder may be a bidirectional cylinder.

Unlike the related art depending on manual work by a worker, the present invention makes it possible to automatically arrange door hinges on a mounting jig at a predetermined mounting angle. Therefore, since it is possible to automatically align the door hinges before mounting the door hinges to the vehicle body, it is possible to improve productivity in mounting door hinges to the vehicle body and to reduce the manufacturing cost.

Further, since it is possible to improve the product quality in assembly by reducing assembly variation of the door hinges through automatic alignment of the mounting angle of the door hinges, it is possible to prevent deformation and deterioration of the external appearance of a door due to assembly variation and to reduce the time taken for the work of maintaining the quality and repair the product in the following processes.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The drawings are provided for reference in describing exemplary embodiments of the present invention and the spirit of the present invention should not be construed only by the accompanying drawings.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Discriminating the names of components with the first, the second, and etc. in the following description is for discriminating them for the same relationship of the components and the components are not limited to the order in the following description.

Throughout the specification, unless explicitly described to the contrary, the word "comprise" and variations such as "comprises" or "comprising", will be understood to imply the inclusion of stated elements but not the exclusion of any other elements.

Further, the terms, "unit", "part", "portion", "member" and etc. used herein refer to the unit of inclusive components performing at least one or more functions or operations.

Figure 1:
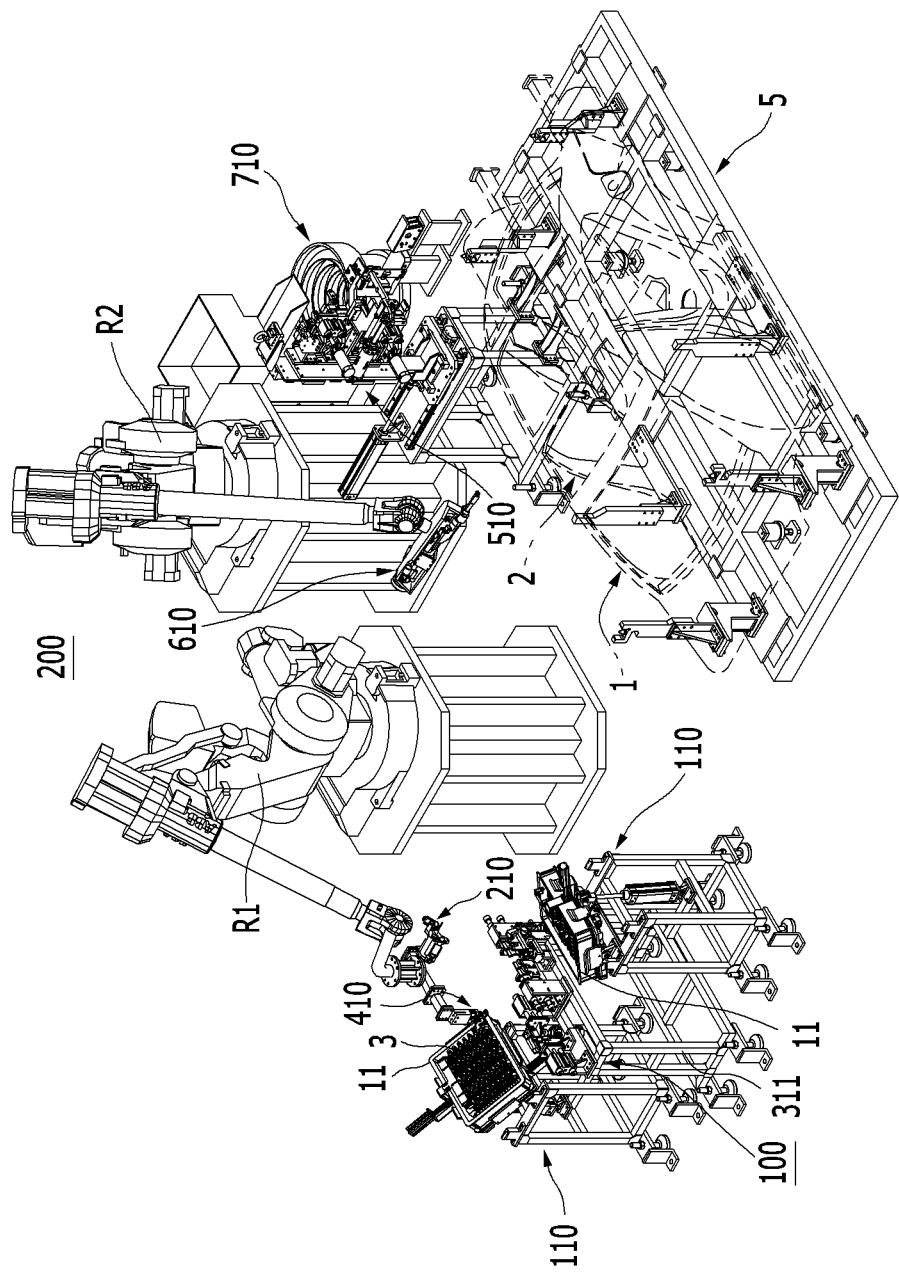
FIG. 1 is a view showing an exemplary automatic system for mounting door hinges to a vehicle where a jig for aligning door hinges according to the present invention is used.

FIG. 1 is a view showing an automatic system for mounting door hinges to a vehicle where a jig for aligning door hinges according to various embodiments of the present invention is used. Referring to FIG. 1, the present invention may be used in a door mounting line for mounting a front door and a rear door to both side panels 2 of a vehicle body 1 in a vehicle body assembly factory.

A jig 100 for aligning door hinges of the present invention may be used for an automatic system 200 for mounting door hinges to a vehicle, such as automatically mounting door hinges 3 to the side panes 2 of the vehicle body 1 conveyed by a conveying unit 5.

Figure 2:
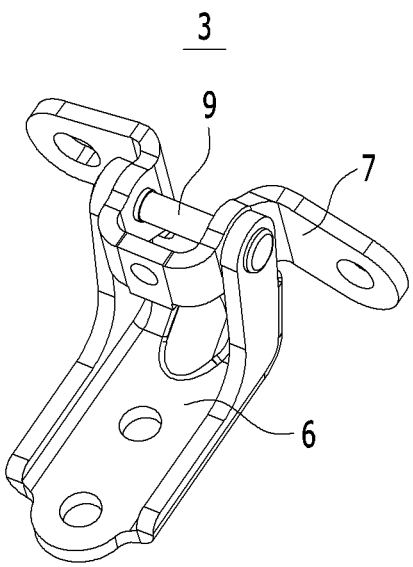
FIG. 2 is a perspective view showing examples of door hinges that are used in a jig for aligning door hinges in an automatic system for mounting door hinges to a vehicle according to the present invention.
Figure 2:
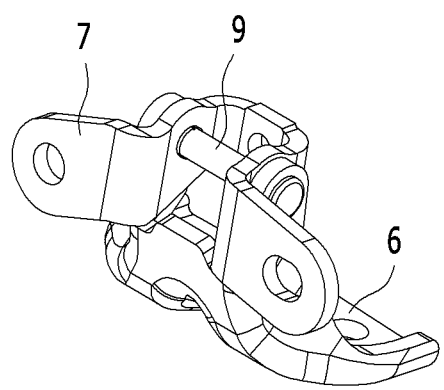

For example, the automatic system 200 for mounting door hinges to a vehicle is used to mount the door hinges 3, as in FIG. 2, in advance to the upper and lower portions of front pillars and rear pillars of the side panels 2 of the vehicle body 1.

The conveying unit 5, which conveys the vehicle body 1, is equipped with various jigs that can fix and support the vehicle body 1.

The door hinges 3 can fall into an upper hinge shown in FIG. 2(a) and a lower hinge shown in FIG. 2(b). The upper hinges may be mounted on the upper portions of the front and rear pillars of the side panel 2 and on the upper portion of a door. The lower hinges may be mounted on the lower portions of the front and rear pillars of the side panel 2 and on the lower portion of a door.

The door hinge 3 includes a hinge bracket 6 to be mounted on the side panel 2, a door bracket 7 to be mounted on a door, and a hinge pin 9 hinging the hinge bracket 6 and the door bracket 7.

Door hinge seats where to mount the door hinges 3 are formed at the upper and lower portions of the front pillar and the rear pillar of the side panel 2. Bolt hole for bolting the door hinges 3 are formed at each of the door hinge seat.

Aligning holes for determining the reference position of the system 200 and the reference positions of the door hinges 3 are formed at the side panels 2 of the vehicle body 1.

The automatic system 200 for mounting door hinges to a vehicle includes a device 110 for aligning door hinges in hinge box, a first gripper 210, the jig 100 for aligning door hinges according to various embodiments of the present invention, a second gripper 410, a mounting jig 510, a bolt runner 610, and a bolt feeder 710.

The device 110 for aligning door hinges in a hinge box is provided to automatically align the door hinges 3 in a hinge box 11.

The first gripper 210 is provided to grip and take out the door hinges 3, which are aligned in the hinge box 11 by the device 110 for aligning door hinges in a hinge box, and to load them onto the jig 100 for aligning door hinges one by one.

The jig 100 for aligning door hinges according to various embodiments of the present invention has a structure capable of arranging the door hinges 3 into a position at a predetermined mounting angle in order to fix the mounting angle of the door hinges 3 between the bolting portion on the vehicle body 1 and the bolting portion on the door. The configuration of the jig 100 for aligning door hinges will be described in more detail below.

The second gripper 410 is provided to grip and unload (take out) the door hinges 3 aligned by the jig 100, and then load the door hinges 3 onto the mounting jig 510.

The mounting jig 510 is provided to clamp the door hinges 3 loaded by the second gripper 410 and set the door hinges 3 into the door hinge seats of the vehicle body 1 while clamping the vehicle body 1.

The bolt runner 610 is provided to bolt the door hinges 3 set in the door hinge seats of the vehicle body 1 by the mounting jig 510 and the bolt feeder 710 is provided to feed bolts to the bolt runner 610.

The first and second grippers 210 and 410 used in the automatic system 200 for mounting door hinges to a vehicle may be moved to the position where the door hinges 3 are arranged by a first handling robot R1 and the bolt runner 610 may be moved to the position where the door hinges 3 are bolted by the second handling robot R1.

The configuration of the jig 100 for aligning door hinges according to various embodiments of the present invention which is used in the automatic system 200 for mounting door hinges to a vehicle is described in detail hereafter.

The jig 100 for aligning door hinges fixes and supports the door hinges 3 taken out of the hinge box 11 by the first gripper 210 and arranges the door hinges 3 into a position at a predetermined mounting angle. That is, the jig 100 for aligning door hinges can arrange the door hinges 3 into a position at a predetermined mounting angle in order to fix the mounting angle of the door hinges 3 between the bolting portion on the vehicle body 1 and the bolting portion on the door.

The jig 100 for aligning door hinges, as shown in FIG. 1, may be disposed between a pair of devices 110 for aligning door hinges in a hinge box which aligns upper hinges in a hinge box 11 and lower hinges in a hinge box 11, in which the upper and lower hinges are the door hinges 3.

The jig 100 for aligning door hinges can fix and support upper hinges and lower hinges, both of which are the door hinges 3, taken out of the hinge boxes 11, and arrange the door hinges 3 into a position at a predetermined mounting angle. By way of illustration, it is exemplified below that the door hinges 3 fixed and supported are upper hinges and arranged into a position at a predetermined mounting angle.

Figure 3:
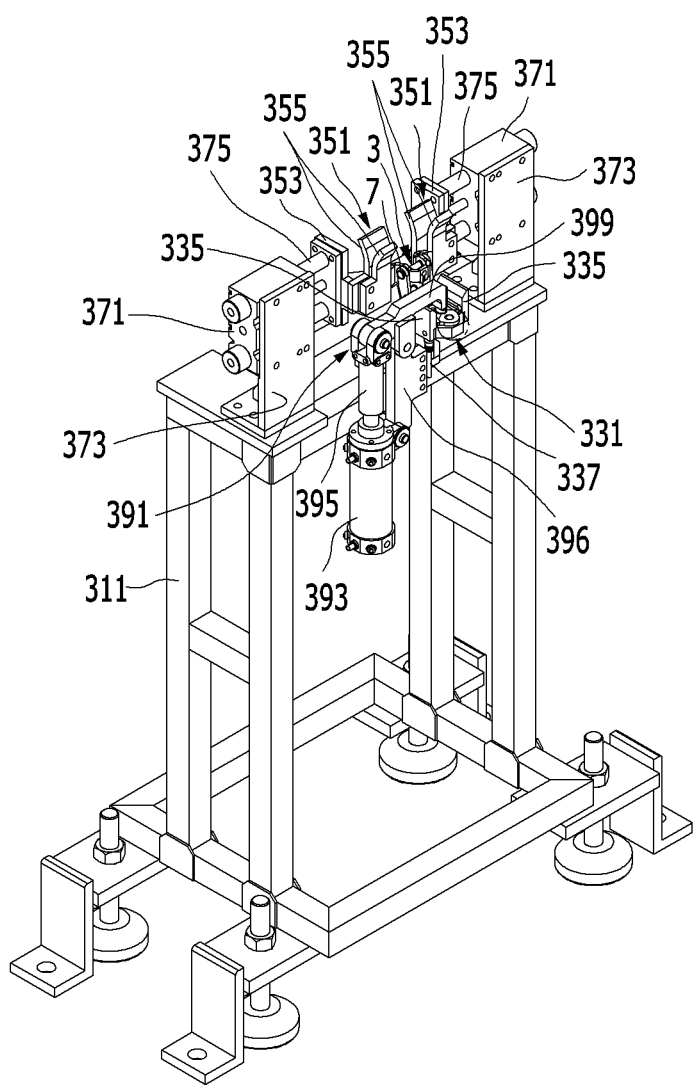
FIG. 3 is a perspective view showing an exemplary jig for aligning door hinges in an automatic system for mounting door hinges to a vehicle according to the present invention.

FIG. 3 is a perspective view showing a jig for aligning door hinges in an automatic system for mounting door hinges to a vehicle according to various embodiments of the present invention. Referring to FIG. 3, the jig 100 for aligning door hinges includes a support frame 311, a first support part 331, second support parts 351, actuating cylinders 371, and a damper 391.

The support frame 311, provided to support various components described below, is disposed between the devices 110 for aligning door hinges in a hinge box as described above. The support frame 311 includes accessories such as various brackets, support blocks, plates, housings, covers, and collars. Since the accessories are provided to install the components on the support frame 311, in many cases, they are collectively referred to as the support frame 311. In other cases, they may be referred to individually or grouped differently.

Figure 4:
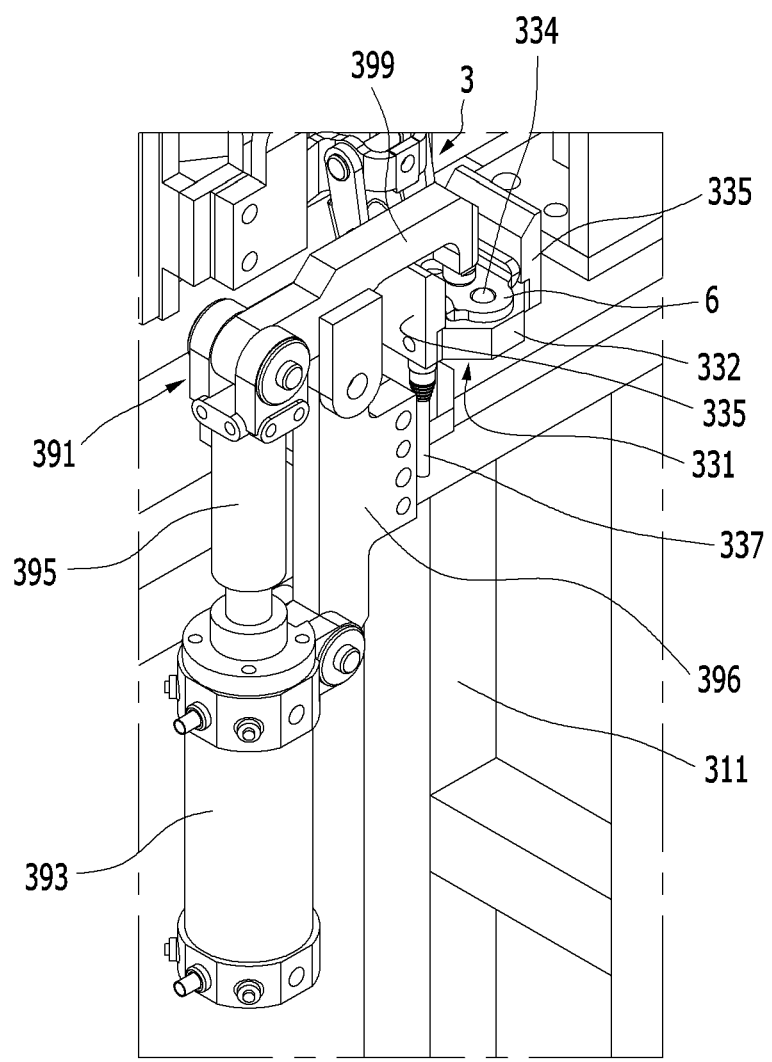
FIG. 4 is an enlarged view showing a first support part in an exemplary jig for aligning door hinges in an automatic system for mounting door hinges to a vehicle according to the present invention.

Referring to FIGS. 3 and 4, the first support part 331 supporting the hinge bracket 6 of a door hinge 3 is fixed to the support frame 311. The first support part 331 where to seat the hinge bracket 6 of the door hinge 3 may include a support bracket 332 mounted on the support frame 311. The first support part 331 includes a pair of guide members 335 guiding both sides of the hinge bracket 6.

The guide members 335 are fixed at both sides of the seat of the support bracket 332 where the hinge bracket 6 is seated. The guide members 335 can guide the hinge bracket 6 of the door hinge 3 gripped by the first gripper 210 to the seat of the first support part 331.

At least one tooling pin 334 that positions the hinge bracket 6 with respect to the first support part 331 and aligns the hinge bracket 6 is formed at the seat of the hinge bracket 6. For example, the tooling pins 334 may be provided in a pair in the first support part 331, and can be fitted in a bolt hole formed at the hinge bracket 6 or a specific tooling hole, and align the hinge bracket 6.

Further, the first support part 331 is equipped with an approach sensor 337 that senses whether the hinge bracket 6 is seated. The approach sensor 337 senses whether there is a hinge bracket 6 seated in the seat of the first support part 331 and outputs a corresponding sensing signal to a controller. Therefore, though not shown in the figures, it should be understood that a sensing hole for passing a sensing signal from the approach sensor 337 is formed at the seat of the first support part 331 where to seat the hinge bracket 6. The approach sensor 337 may be an approach sensor known in the art, so the configuration is not described in detail herein.

Figure 5:
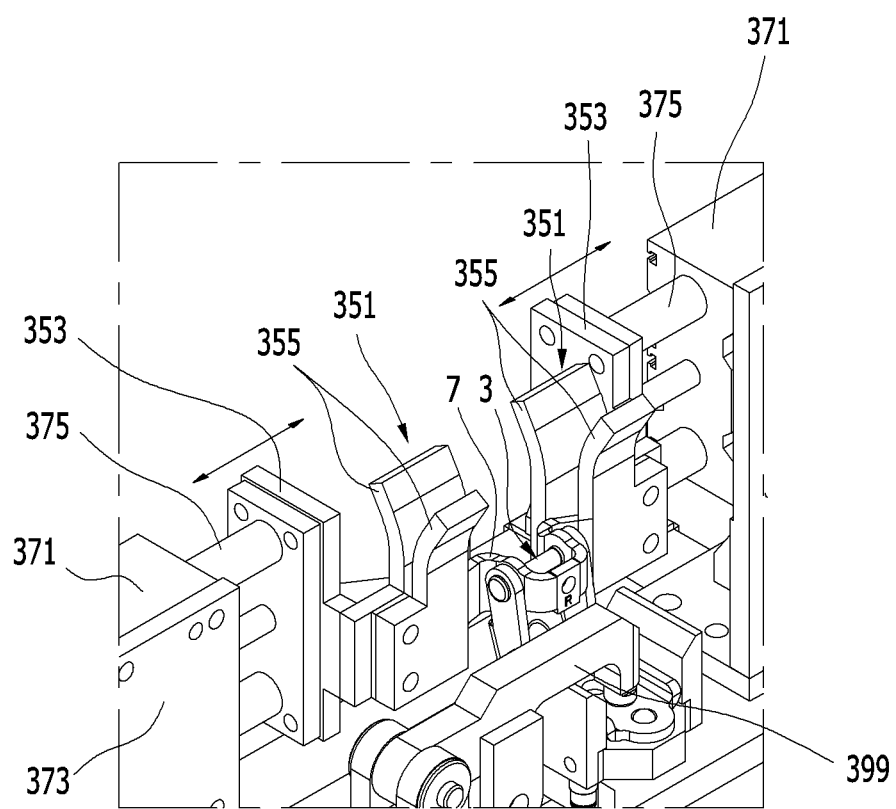
FIG. 5 is an enlarged view showing second support parts in an exemplary jig for aligning door hinges in an automatic system for mounting door hinges to a vehicle according to the present invention.

Referring to FIGS. 3 and 5, the second support parts 351 supporting both sides of the door bracket 7 of a door hinge 3 are disposed on the support frame 311. The second support parts 351 are arranged at both sides from the first support part 331 to be movable on the support frame 331. The second support parts 351 can reciprocate closer to or away from the first support part 331.

That is, the second support parts 351 can be moved away from the first support part 331 before the hinge bracket 6 of the door hinge 3 is seated in the seat of the first support part 331 and can be moved closer to the first support part 331 after the hinge bracket 6 is seated in the seat of the first support part 331. Further description of the configuration of the second support parts 351 is provided in relation to other parts below.

The actuating cylinders 371 provided to reciprocate the second support parts 351 are fixed to the support frame 311, corresponding to the second support parts 351. The actuating cylinders 371 are fixed to the support frame 311 by fixing brackets 373 and may be connected with the second support parts 351.

The second support parts 351 each includes a pair of guide plates 355 fixed to the free end of an actuating rod 375 of the actuating cylinder 371 by a mounting bracket 353. The mounting bracket 353 may be fixed to the actuating rod 375 of the actuating cylinder 371.

The pair of guide plates 355, provided to fix both sides of the door bracket 7 and arrange the door hinge 3 into a position at a predetermined mounting angle, may face each other with a gap therebetween. The upper portions of the guide plates 355 may be smoothly curved away from each other.

The reason of smoothly curving the upper portions of the guide plates 355 away from each other is for easily taking out the door hinge 3 from the second support part 351, when taking out the door hinge 3 aligned by the first and second support parts 331 and 351 with the second gripper 410, which is described in detail below.

The damper 391, provided to clamp the hinge bracket 6 seated in the seat of the first support part 331, is fixed to the support frame 311. The damper 391 is pivoted by actuating a clamping cylinder 393 and clamps the hinge bracket 6 of the door hinge 3. The damper 391 includes a clamping member 399 that actually clamps the hinge bracket 6 of the door hinge 3.

The clamping member 399 is hinged at one end to the free end of an actuating rod 395 of the clamping cylinder 393 and hinged at the other end to a fixing block 396 fixed to the support frame 311.

The operation of the jig 100 for aligning door hinges in an automatic system for mounting door hinges to a vehicle according to various embodiments of the present invention which has the configuration described above is described hereafter in detail with reference to the drawings stated above.

The operation of the jig 100 for aligning door hinges is described hereafter in association with main components of the automatic system 200 for mounting door hinges to a vehicle where various embodiments of the present invention is applied. As an example, the following operations are performed with the vehicle body 1, which has been conveyed by the conveying unit 5, in stop at a predetermined work position.

First, the jig 110 for aligning door hinges in a hinge box according to various embodiments of the present invention can automatically align the door hinges 3 contained in a hinge box 11 as described above, using vibration and the gravity.

Thereafter, the first gripper 210 grips a door hinge 3 aligned in the hinge box 11 and takes out the door hinge 3 from the hinge box 11 by the operation of the first handling robot R1.

Thereafter, in various embodiments of the present invention, the door hinge 3 gripped by the first gripper 210 are moved to the first support part 331 of the jig 100 by the operation of the first handling robot R1.

The second support parts 351 of the jig 100 have been moved away from the first support part 331 by the retracting operation of the actuating cylinders 371.

In various embodiments of the present invention, the hinge bracket 6 of a door hinge 3 is seated on the first support part 331 by the first handling robot R1, with the door hinge 3 gripped by the first gripper 210.

The hinge bracket 6 of the door hinge 3 can be easily seated in the seat of the first support part 331 while being guided by the guide member 335. Further, the hinge bracket 6 of the door hinge 3 can be arranged into a position on the first support part 331 by being fitted on the tooling pin 334 of the first support part 331.

In this process, the approach sensor 337 of the first support part 331 senses the hinge bracket 6 seated in the seat of the first support part 331 and outputs a corresponding sensing signal to the controller.

The controller makes the first gripper release the door hinge in response to the sensing signal from the approach sensor 337 and the first gripper 210 is moved to the device 110 for aligning door hinges in a hinge box by the first handling robot R1.

With the first gripper 210 moved away and the hinge bracket 6 of the door hinge 3 in position on the first support part 331, as described above, the damper 391 of the jig 100 is pivoted by the operation of the clamping cylinder 393 and clamps the hinge bracket 6.

Thereafter, in various embodiments of the present invention, the actuating rods 375 of the actuating cylinders 371 extend and move the guide plates 355 of the second support parts 351 closer to each other toward the first support part 331.

Thereafter, both sides of the door bracket 7 of the door hinge 3 enter between the guide plates 355 of the second support part 351 and the guide plates 355 fix the door bracket 7.

Therefore, with the present invention, it is possible to arrange a door hinge 3 into a position at a predetermined mounting angle, using the first and second support parts 331 and 351 and the damper 391. That is, with the present invention, it is possible to arrange the door hinge 3 into a position at a predetermined mounting angle to fix the mounting angle of the door hinge 3 between the bolting portion on the vehicle body 1 and the bolting portion on the door.

On the other hand, in the automatic system 200 for mounting door hinges to a vehicle which uses various embodiments of the present invention, the second gripper 410 grips the door hinge 3 aligned by the jig 100.

In this process, the damper 391 of the jig 100 is pivoted by the operation of the clamping cylinder 393 and unclamps the hinge bracket 6. Accordingly, the second gripper 410 takes out the door hinge 3 from the jig 100 by operation of the first handling robot R1.

The door hinge 3 gripped by the second gripper 410 can be moved up by the first handling robot R1 and taken out from between the guide plates 355 of the second support part 351.

In the process described above, since the upper portions of the guide plates 355 are smoothly curved away from each other in various embodiments of the present invention, the door bracket 7 of the door hinge 3 can be easily taken out from the guide plates 355.

After the door hinge 3 gripped by the second gripper 410 is taken out from the second support part 351 of the jig 100, the second support part 351 returns with the retracting operation of the actuating cylinders 371.

Thereafter, the first handling robot R1 moves the door hinge 3 gripped by the second gripper 410 to the mounting jig 510.

Then, the mounting jig 510 clamps the door hinge 3 loaded by the second gripper 410 and sets the door hinge 3 into a door hinge seat of the vehicle body 1, the vehicle body 1 clamped.

After the door hinges 3 are set with respect to the vehicle body 1, the door hinges 3 can be bolted to the vehicle body 1 by the bolt runner 610 that is operated by a second handling robot R2.

Accordingly, unlike the related art depending on manual work by a worker, the present invention makes it possible to automatically arrange door hinges 3 to mount the mounting jig 510 into a position at a predetermined mounting angle.

Therefore, with the present invention, since it is possible to automatically align the door hinges 3 before mounting the door hinges 3 to the vehicle body 1, it is possible to improve productivity in mounting door hinges to the vehicle body 1 and to reduce the manufacturing cost, including wages of workers who work in person.

Further, since it is possible to improve the product quality in assembly by reducing assembly variation of the door hinges 3 through automatic alignment of the mounting angle of the door hinges 3 in the present invention, it is possible to prevent deformation and deterioration of the external appearance of a door due to assembly variation and to reduce the time taken for the work of maintaining the quality and repair the product in the following processes.

Figure 6:
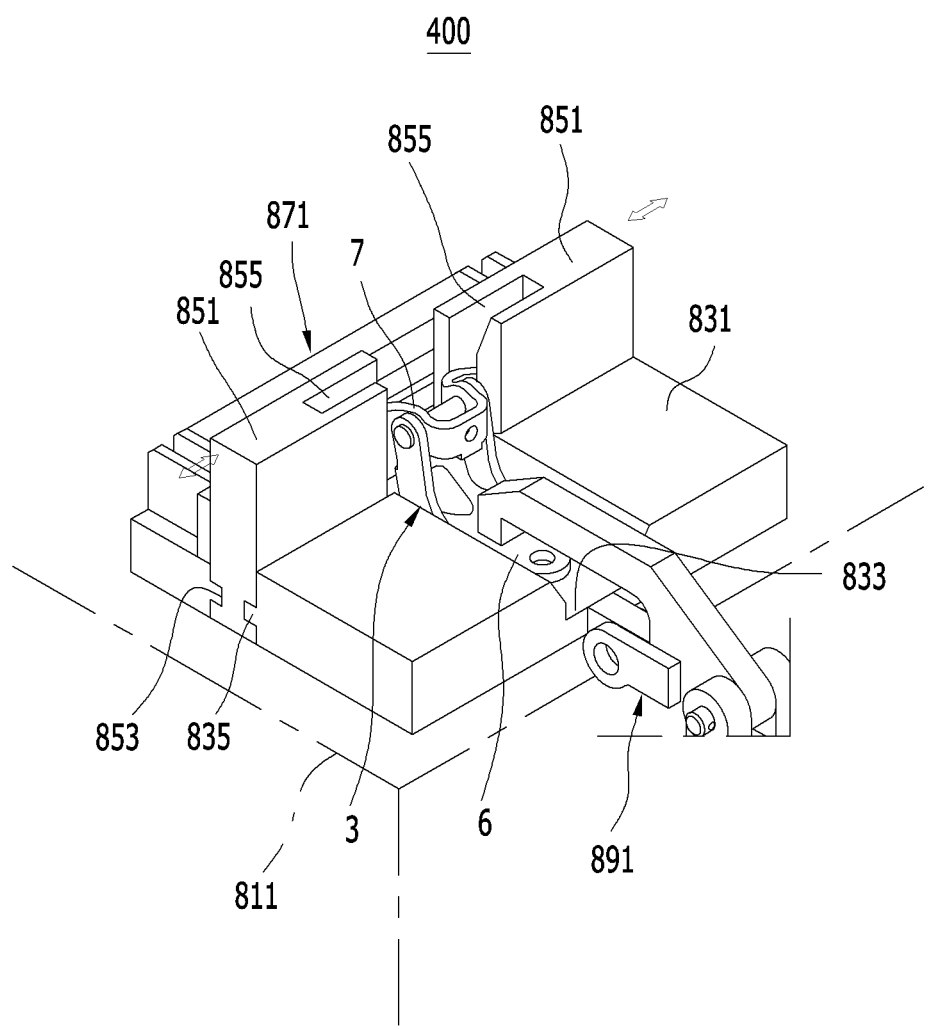
FIG. 6 is a perspective view showing another exemplary jig for aligning door hinges in an automatic system for mounting door hinges to a vehicle according to the present invention.

FIG. 6 is a perspective view showing a jig for aligning door hinges in an automatic system for mounting door hinges to a vehicle according to various embodiments of the present invention. Referring to FIG. 6, a jig 400 for aligning door hinges in an automatic system for mounting door hinges to a vehicle includes a base member 831, supporting members 851, and an actuating cylinder 871. The jig 400 also includes a support frame 811 and a clamper 891, which are similar or substantially the same as those as described above.

The base member 831 is fixed on the support frame 811. The base member 831 supports a hinge bracket 6 of a door hinge 3. A seating groove 833 where to seat the hinge bracket 6 of the door hinge 3 is formed on the top of the base member 831.

The supporting members 851, which respectively support both sides of the door bracket 7 of the door hinge 3 on the base member 831, are disposed at both sides from the door hinge 3 movably on the base member 831.

The supporting members 851 can be reciprocated closer to or away from each other toward the door hinge 3. The supporting members 851 are slidably fitted on guide rails 835 of the base member 831.

A guide grooves 853 fitted on the guide rails 835 are formed on the supporting members 851. Further, fixing grooves 855 for fixing both sides of the door bracket 7 are formed on the supporting members 851.

The actuating cylinder 871, which reciprocates the supporting members 851 relatively to the base member 831, is fixed to the base member 831 and connected with the supporting members 851. The actuating cylinder 871 may be a bidirectional cylinder that extends and retracts actuating rods to both sides. A bidirectional actuating cylinder is known in the art, so the configuration is not described in detail herein.

Therefore, according to the jig 400 for aligning door hinges in an automatic system for mounting door hinges to a vehicle according to various embodiments of the present invention which has the configuration described above, with the supporting members 851 moved away from each other by the actuating cylinder 871, the hinge bracket 6 of the door hinge 3 is seated into the seating groove 833 and then the hinge bracket 6 is clamped by operating the damper 891.

Thereafter, as the supporting members 851 are moved closer to each other by the actuating cylinder 871, both sides of the door bracket 7 of the door hinge 3 are inserted into the fixing grooves 855 of the supporting members 851, such that the supporting members 851 fix and support the door bracket 7.

Therefore, with the present invention, it is possible to arrange the door hinge 3 into a position at a predetermined mounting angle, using the base member 831, the supporting members 851, and the damper 891. That is, it is possible to arrange the door hinge 3 into a position at a predetermined mounting angle to fix the mounting angle of the door hinge 3 between the bolting portion on the vehicle body 1 and the bolting portion on the door.

The other configurations and operations of the jig 400 for aligning door hinges in an automatic system for mounting door hinges to a vehicle are similar to substantially the same as those previously described, such as those described in the context of the jig 100, so the detailed description is not provided.

For convenience in explanation and accurate definition in the appended claims, the terms "upper" or "lower", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A jig for aligning a door hinge into a position at a predetermined mounting angle, in an automatic system that automatically mounts door hinges to upper and lower seats on pillars of a vehicle body conveyed by a conveying unit, the jig comprising:
    a support frame;
    a first support part fixed to the support frame for supporting a hinge bracket of the door hinge;
    a pair of second support parts movably disposed at both sides of the first support part for respectively supporting both sides of a door bracket of the door hinge;
    actuating cylinders fixed to the support frame and connected with the second support parts; and
    a clamper fixed to the support frame for clamping the hinge bracket by operation of a clamping cylinder.

2. The jig of claim 1, wherein a pair of guide members for guiding both sides of the hinge bracket is included in the first support part.

3. The jig of claim 2, wherein at least one tooling pin for aligning the hinge bracket is formed at the first support part.

4. The jig of claim 3, wherein an approach sensor configured to sense whether the hinge bracket is seated is included in the first support part.

5. The jig of claim 1, wherein each of the second support parts includes:
    a mounting bracket fixed to an actuating rod of the actuating cylinder; and
    a pair of guide plates facing each other at a predetermined distance and fixed to the mounting bracket, wherein the pair of guide plates is configured for fixing the respective side of the door bracket and for arranging the door hinge into the position at the predetermined mounting angle.

6. The jig of claim 5, wherein upper portions of the pair of guide plates are smoothly curved away from each other.

7. A jig for aligning a door hinge into a position, in an automatic system that automatically mounts door hinges to upper and lower seats on pillars of a vehicle body conveyed by a conveying unit, the jig comprising:
    a support frame;
    a base member fixed to the support frame for supporting a hinge bracket of the door hinge;
    a pair of supporting members disposed on the support frame to be movable toward or away from each other at both sides of the door hinge, and respectively supporting both sides of a door bracket of the door hinge;
    actuating cylinders fixed to the base member and for connected with the supporting members; and for
    a clamper fixed to the support frame for clamping the hinge bracket.

8. The jig of claim 7, wherein a seating groove where to seat the hinge bracket of the door hinge is formed on the base member.

9. The jig of claim 7, wherein fixing for grooves fixing the both sides of the door bracket are formed at the supporting members, respectively.

10. The jig of claim 7, wherein the actuating cylinders are bidirectional cylinders.

\* \* \* \* \*